United States Patent
Eleftheriadis et al.

(10) Patent No.: US 12,538,145 B2
(45) Date of Patent: Jan. 27, 2026

(54) PRE-FAULT DETECTION OF HARDWARE DEGRADATION

(71) Applicant: Telefonaktiebolaget LM Ericsson (publ), Stockholm (SE)

(72) Inventors: Lackis Eleftheriadis, Valbo (SE); Bengt-Ake Bengtsson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 627 days.

(21) Appl. No.: 17/786,851

(22) PCT Filed: Dec. 18, 2019

(86) PCT No.: PCT/IB2019/060970
§ 371 (c)(1),
(2) Date: Jun. 17, 2022

(87) PCT Pub. No.: WO2021/123879
PCT Pub. Date: Jun. 24, 2021

(65) Prior Publication Data
US 2023/0017860 A1 Jan. 19, 2023

(51) Int. Cl.
*H04W 24/04* (2009.01)
*H04W 24/08* (2009.01)

(52) U.S. Cl.
CPC ........... *H04W 24/04* (2013.01); *H04W 24/08* (2013.01)

(58) Field of Classification Search
CPC .............................. H04W 24/04; H04W 24/08
See application file for complete search history.

(56) References Cited

U.S. PATENT DOCUMENTS

| 5,255,208 A | * | 10/1993 | Thakore | ................. | G01R 31/40 714/45 |
|---|---|---|---|---|---|
| 2012/0200271 A1 | | 8/2012 | Henzler | | |
| 2013/0143561 A1 | * | 6/2013 | Nuss | ..................... | H04W 24/02 455/436 |

(Continued)

OTHER PUBLICATIONS

International Search Report and the Written Opinion of the International Searching Authority, issued in corresponding International Application No. PCT/IB2019/060970, dated Aug. 20, 2020, 14 pages.

*Primary Examiner* — Rasheed Gidado
(74) *Attorney, Agent, or Firm* — Rothwell, Figg, Ernst & Manbeck, P.C.

(57) ABSTRACT

Methods, apparatus and systems for pre-fault detection of hardware degradation; when embodied in a radio base station (RBS) of a wireless communications network, the method is characterized by: sensing at least a portion of an electrical waveform at a circuit location in the RBS; determining the radio resource load of the RBS proximate to the time of sensing the electrical waveform, the radio resource load being a measure of scheduled radio transmissions; determining whether the sensed electrical waveform is within a nominal operating window corresponding to the radio resource load, wherein the nominal operating window is a function of the sensed electrical waveform for the radio resource load at a prior time; and, if the sensed electrical waveform is not within the corresponding nominal operating window, triggering an alarm to indicate that the hardware has reached a degradation limit.

35 Claims, 4 Drawing Sheets

(56) References Cited

U.S. PATENT DOCUMENTS

| | | | | |
|---|---|---|---|---|
| 2014/0187236 A1* | 7/2014 | Chiang | ................ | H04W 24/04 |
| | | | | 455/423 |
| 2016/0150404 A1* | 5/2016 | Sugitani | ................ | H04L 9/0891 |
| | | | | 713/160 |
| 2018/0088656 A1* | 3/2018 | Arduini | ................ | G01R 31/44 |
| 2019/0197858 A1* | 6/2019 | Moses | ................ | H04L 12/6418 |

* cited by examiner

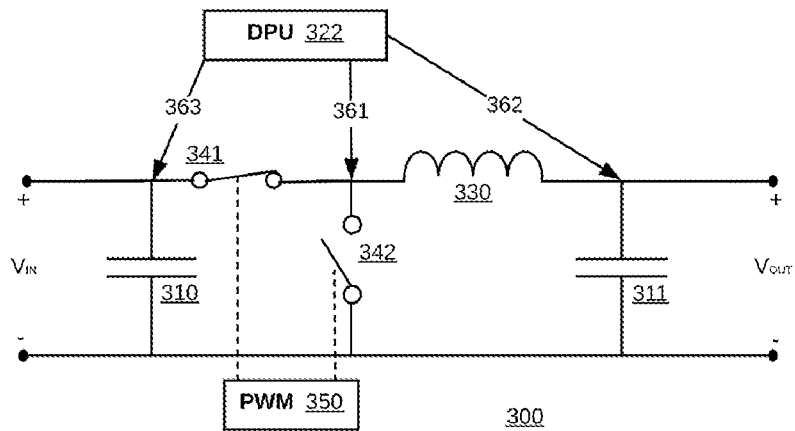
FIGURE 3-A
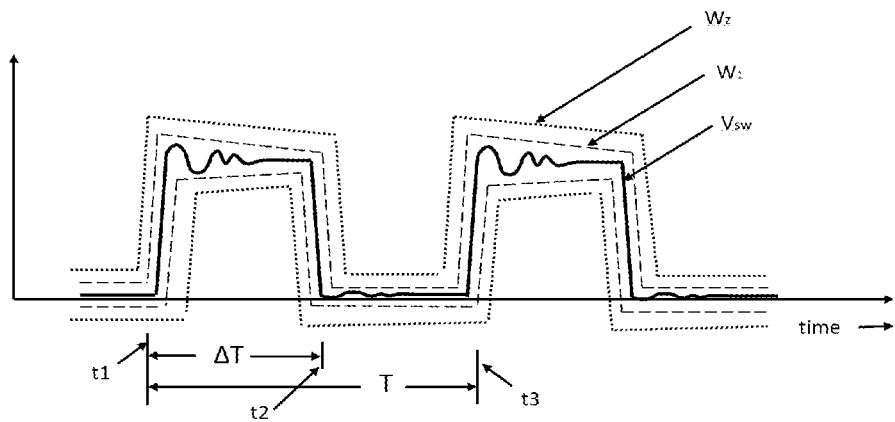
FIGURE 3-B
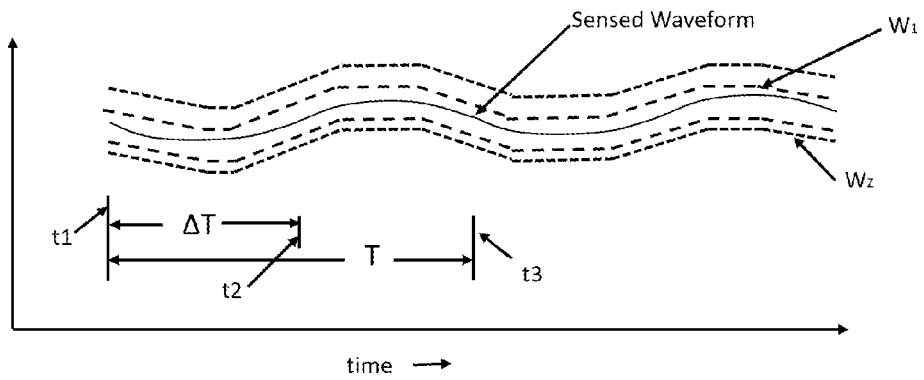
FIGURE 3-C

PRE-FAULT DETECTION OF HARDWARE DEGRADATION

CROSS REFERENCE TO RELATED APPLICATION(S)

This application is a 35 U.S.C. § 371 National Phase Entry Application from PCT/IB2019/060970, filed Dec. 18, 2019, designating the United States, the disclosure of which is incorporated herein by reference in its entirety.

TECHNICAL FIELD

The present disclosure is directed, in general, to electrical circuit diagnostics and, more specifically, to methods, apparatus, and systems for pre-fault detection of hardware degradation, such as in a radio base station (RBS) of a wireless communications network.

BACKGROUND

Computer and wireless communications networks have become ubiquitous in modern life; they provide the ability to quickly access information and stay in constant contact. The advent of next generation "5G" wireless networks and the proliferation of Internet of Things (IoT) devices will bring new features and functionality. Fifth-generation technology relies in large part on high capacity transmission, which uses high-frequency, short-length radio waves with short ranges; as each 5G base station covers a smaller area than with 3G and 4G networks, carriers are looking to build denser networks using cheaper and more compact stations. Furthermore, future 5G radio requirements will demand increased reliability and resiliency for critical applications.

Both computer and wireless communications networks are built with similar digital computer hardware, but they also include power conversion circuitry which is typically one of the most common subsystems prone to failure. Various diagnostic systems for use with electrical hardware are known to those skilled in the art; for example, U.S. Pat. No. 5,255,208, entitled "On-Line Processor Based Diagnostic System" (hereinafter, the '208 Patent), describes a method and apparatus for detecting faults and power failures in DC-DC power converters. Signals are sensed at selected strategic test points in a circuit and compared with stored expected signals for those points under normal operating conditions. Whenever the signals sensed at the selected test points do not correlate with the corresponding expected signals, the sensed signal is compared with abnormal signals stored in the memory associated with known failure conditions for that test point. Whenever the sensed signal matches closely with a signal for a known failure condition, an indication of the particular failure is logged into memory. If the sensed signal does not match a known failure condition, an indication of an unknown failure condition is logged into memory. Failure information can later be retrieved by maintenance personnel at a convenient time or can be displayed on an operator's display during operation. While the methods disclosed in the '208 Patent can be useful in identifying a hardware failure, the patent does not disclose a method for pre-fault detection of hardware degradation. If the potential for hardware failure can be predicted, then replacement of a computer or wireless communications network node, or subsystem, can be performed prior to failure, thus ensuring minimal or no network downtime.

SUMMARY

To address the deficiencies of the prior art, the embodiments disclosed hereinafter are directed to apparatus, methods and systems for pre-fault detection of hardware degradation, such as in a radio base station (RBS) of a wireless communications network; the various embodiments can overcome disadvantages of the prior art or provide novel advantages. In an exemplary embodiment, a method in a communications network for pre-fault detection of hardware degradation is characterized by sensing at least a portion of an electrical waveform at a circuit location in an RBS; determining the radio resource load of the RBS proximate to the time of sensing the electrical waveform, the radio resource load being a measure of scheduled radio transmissions; determining whether the sensed electrical waveform is within a nominal operating window corresponding to the radio resource load, wherein the nominal operating window is a function of the sensed electrical waveform for the radio resource load at a prior time; and, if the sensed electrical waveform is not within the corresponding nominal operating window, triggering an alarm to indicate that the hardware has reached a degradation limit. The prior time for the hardware for which the nominal operating window is defined can, for example, correspond to a value at the time of manufacture; i.e., prior to any period of operation sufficient to have caused degradation in the hardware.

In alternative embodiments, the step of sensing the electrical waveform can be performed at predefined intervals or whenever the radio resource load corresponds to one or more predefined levels. The electrical waveform can be sampled for a predefined sampling period and the nominal operating window can be defined by an upper or lower threshold, or both; the upper or lower thresholds can be a function of a predefined deviation of the sensed electrical waveform from the electrical waveform at the prior time. In some embodiments, the nominal operating window can also be a function of a temporal measure of the electrical waveform at the prior time, and it can be defined by boundaries that are a function of a predefined deviation from the temporal measure.

The method can further be characterized by determining whether the sensed electrical waveform is within a second (or further) operating window, wherein the second operating window is greater than the corresponding nominal operating window; determining whether the sensed electrical waveform has exceeded the nominal operating window and one or more further operating windows can be indicative of a relative measure of degradation of the hardware. In such embodiments, the step of triggering an alarm can further include indicating the relative measure of degradation of the hardware.

The method can be implemented in one or more nodes of a communications network utilizing at least one processor and at least one memory, wherein the at least one memory holds instructions which, when executed by the at least one processor, are operative to perform at least the essential functions. The essential and optional functions can be performed, as required or preferred, in one or multiple nodes of the network. In a specific embodiment described hereinafter, all of the functions are performed in an RBS, wherein the sensed electrical waveform is within a DC/DC converter of an associated radio unit. In such embodiments, a nominal operating window for one sensed electrical waveform can be a function of the duty cycle of the DC/DC converter for the radio resource load at the prior time, and it can be defined by boundaries that are a function of a predefined deviation from the duty cycle.

The foregoing has broadly outlined the essential and optional features of the various embodiments that will be described in detail hereinafter; the essential and certain optional features form the subject matter of the appended claims. Those skilled in the art should recognize that the principles of the specifically-disclosed apparatus, methods and systems for pre-fault detection of hardware degradation can be utilized as a basis for modifying or designing other apparatus, methods and systems, including employing the principles to advantageous use in systems other than wireless communications networks or RBSs.

BRIEF DESCRIPTION OF THE DRAWINGS

For a more complete understanding of the present disclosure, reference is now made to the following detailed description taken in conjunction with the accompanying drawings, in which:

FIG. 3-A illustrates an exemplary DC/DC converter;

FIG. 3-B illustrates a first electrical waveform associated with the DC/DC converter illustrated in FIG. 3-A;

FIG. 3-C illustrates a second electrical waveform associated with the DC/DC converter illustrated in FIG. 3-A;

Corresponding numerals and symbols in the different figures generally refer to corresponding parts unless otherwise indicated.

DETAILED DESCRIPTION

Figure 1:
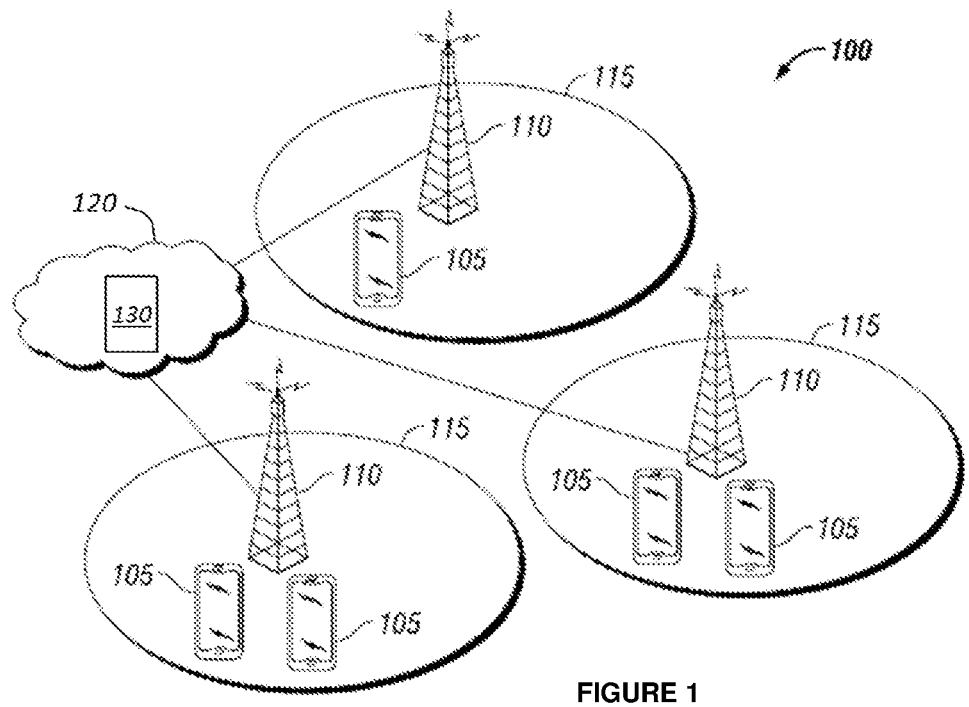
FIG. 1 illustrates an exemplary wireless communications network.

The embodiments described hereinafter illustrate the disclosed principles in a wireless communications network; specifically, methods, apparatus and systems for pre-fault detection of hardware degradation in an RBS. The principles, however, can also be employed to advantage in general computer networks. FIG. 1 illustrates an exemplary wireless communications network 100, characterized by a plurality of RBSs 110, each coupled to a core network 120. The core network 120 includes various functional nodes, generally referenced as 130, for managing the operation of the network 100; as will be described infra, some of the functions disclosed herein for detection of hardware degradation can be implemented in one or more of the nodes 130. Each RBS 110 defines a cell 115 of the network 100 and provides wireless communications capability to user equipment (UE) 105 within its range of operation. As is known in the art of cellular communications, each RBS 110 includes one or more base station units (BSs), each having one or more associated radio units (RUs); see, for example, U.S. patent application Ser. No. 15/569,214, entitled "Radio Base Station Powered Using Wireless Power", by Lackis Eleftheriadis, Per Eklund and Jan-Erik Lundberg, incorporated herein by reference. A RU includes transmitter circuitry for use in transmitting traffic data wirelessly via one or more antennas; the transmitter circuitry typically includes a power amplifier, among other components, that is coupled to an antenna.

Figure 2:
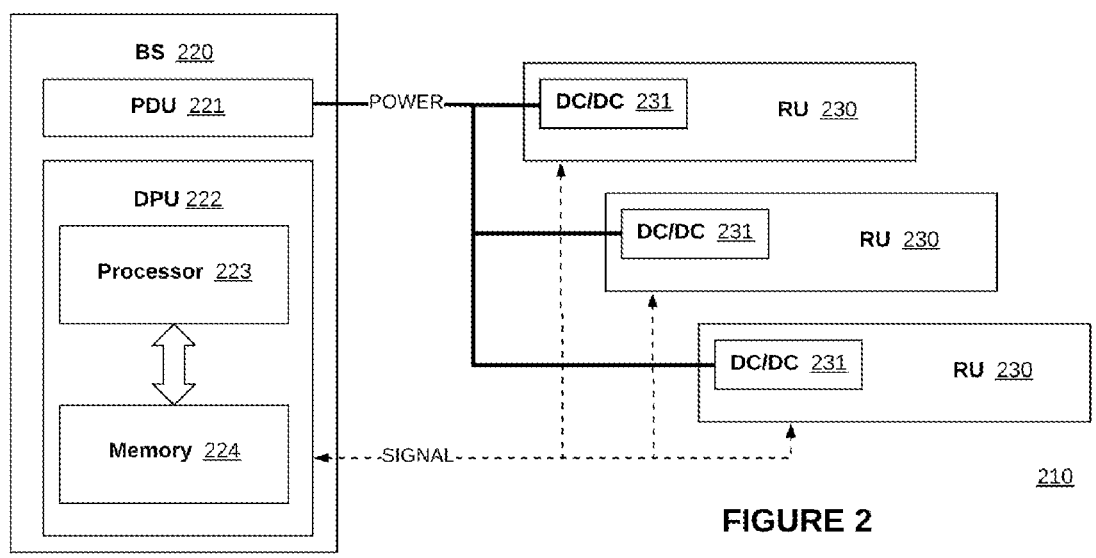
FIG. 2 illustrates an exemplary radio base station.

Referring now to FIG. 2, illustrated is a block schematic of an exemplary RBS 210, having a BS 220 and three associated RUs 230. The BS 220 includes a power distribution unit (PDU) 221 and a digital processing unit (DPU) 222, which includes a processor 223 and memory 224; the memory can hold instructions which, when executed by the processor, are operative to cause the BS to execute certain operations, including those described herein. Each RU 230 includes a DC/DC converter 231 for receiving and converting power from PDU 221 to a voltage suitable for powering the RU transmitter and other circuitry (not illustrated). A signal connection couples each RU 230 to the PDU 222.

As noted supra, power conversion circuitry is particularly prone to hardware degradation and failure; as such, the principles disclosed herein are advantageously implemented for pre-fault detection of hardware degradation in each of DC/DC converters 231. One type of DC/DC converter is a switched-mode power supply (SMPS). Those skilled in the art are familiar with the operation of a SMPS and a detailed description is unnecessary herein; a basic description, however, is provided for the purpose of illustrating the principles of the claimed embodiments.

Referring to FIG. 3-A, illustrated is an exemplary DC/DC converter, or switched-mode power supply SMPS (SMPS) 300, which includes an input capacitor 310, output capacitor 311, inductor 330, and switches 341, 342. SMPS 300 converts a DC input voltage $V_{IN}$ to a desired DC output voltage $V_{OUT}$ through use of a pulse-width modulator (PWM) 350 to control switches 341 and 342; alternately turning switches 341, 342 on and off produces a relative square wave at the input of inductor 330, as illustrated in FIG. 3-B. The ratio between on and off times of switches 341, 342, known as the duty cycle, can be changed as a function of the required output voltage of SMPS 300.

To implement the functionality disclosed herein, exemplary probes 361, 362, 363 are provided to sense electrical waveforms at various circuit locations in SMPS 300. The probes are coupled to DPU 322 which, like DPU 222, includes a processor and memory (not shown); the memory can hold instructions which, when executed by the processor, are operative to perform certain operations within SMPS 300, including causing one or more of the probes 361, 362, 363 to sense desired electrical waveforms. For example, the waveform sensed by probe 361 will be similar in form to that illustrated in FIG. 3-B. The waveform sensed across output capacitor 311 (i.e., $V_{OUT}$) by probe 362 should nominally be similar to that illustrated in FIG. 3-C; while $V_{OUT}$ should, ideally, be a relatively constant DC value, it can have an inherent measure of ripple, which may increase in view of capacitor degradation. See, for example: Kulkarni, Chetan & Biswas, Gautam & Koutsoukos, X. & Goebel, Kai & Celaya, Jose. (2010). *Physics of Failure Models for Capacitor Degradation in DC-DC Converters* (https://data.nasa.gov/dataset/Physics-of-Failure-Models-for-Capacitor-Degradatio/5b6a-q3i8). Similarly, probe 363 can sense the input voltage $V_{IN}$ across input capacitor 310; alternatively, probe 363 could sense another voltage or current somewhere within SMPS 300, including the current through a thermistor to determine a temperature within the SMPS. The principles of the invention are not limited to sensing any particular, or number of, electrical waveforms.

Referring now to FIG. 3-B, illustrated is the switching waveform at the input to inductor 330 resulting from the alternate operation of switches 341, 342 under control of PWM 350; the switching frequency of SMPS 300 has duration T and the duty cycle has duration ΔT. Similarly, FIG. 3-C illustrates an exemplary waveform across output capacitor 311. In accordance with the principles disclosed herein, one or more windows $W_1$, $W_Z$ are defined for each sensed waveform; there is no limit to the number of windows that can be defined.

As will be described with reference to FIG. 4, sensing one or more waveforms within SMPS 300 is performed in conjunction with determining a radio resource load for the RBS 210 proximate to the time of sensing the electrical waveform(s); the radio resource load is a function of scheduled radio transmissions (i.e., the active channels/timeslots scheduled for transmission). It is then determined whether the sensed electrical waveform is within a nominal operating window corresponding to the radio resource load, wherein the nominal operating window is a function of the sensed electrical waveform for the radio resource load at a prior time (e.g., at the time of manufacture) and, if the sensed electrical waveform is not within the corresponding nominal operating window, triggering an alarm to indicate that the hardware has reached a degradation limit. For the sensed waveforms illustrated in FIGS. 3-B, 3C, the nominal operating window can be, for example, window $W_1$. At the time of manufacture or field installation, various radio resource loads (e.g., 10%, 20%, etc.) can be applied to the RBS 210 and measurements taken at various locations within the DC/DC converter 300 to establish a nominal operating window for each sensed electrical waveform; alternatively, a nominal operating window can be defined after a certain number of "burn-in" hours, or other criteria, and updated within a memory of DPU 222 or 322 (or another DPU within a node 130 of core network 120).

The sensed waveforms can be sampled for a predefined sampling period, such as for the switching period T or duty cycle ΔT of the SMPS 300 (as illustrated in FIG. 3-B), and the nominal operating window can be defined by an upper or lower threshold, or both. In effect, the thresholds and sampling period create a "window" around the sensed waveform; a nominal operating window can, thus, have both absolute value and temporal aspects. For example, operating window $W_1$ can be defined by a predefined deviation of the sensed electrical waveform from a prior value; e.g., upper and lower thresholds of ±20% of the value of the sensed waveform at the time of manufacture. As illustrated in FIG. 3-B, a nominal operating window can also be a function of a temporal measure of the electrical waveform; for example, the nominal operating window can be defined by boundaries that are a function of a predefined deviation from a temporal measure, such as no more than a ±10% deviation in the duty cycle ΔT for a given radio resource load.

In addition to a nominal operating window $W_1$, one or more further operating windows $W_Z$ can be defined, each greater in value than $W_1$, and it can be determined whether the sensed waveform is within a second (or further) operating window. For example, if $W_1$ is defined by upper and lower thresholds of ±20% of the value of the sensed waveform at the time of manufacture, $W_Z$ can be defined by upper and lower thresholds of ±40%. Determining whether the sensed waveform has exceeded a nominal operating window and one or more further operating windows can be indicative of a relative measure of degradation of the hardware; logging the time and date at which such operating windows are exceeded can be utilized to estimate the rate of degradation.

Figure 4:
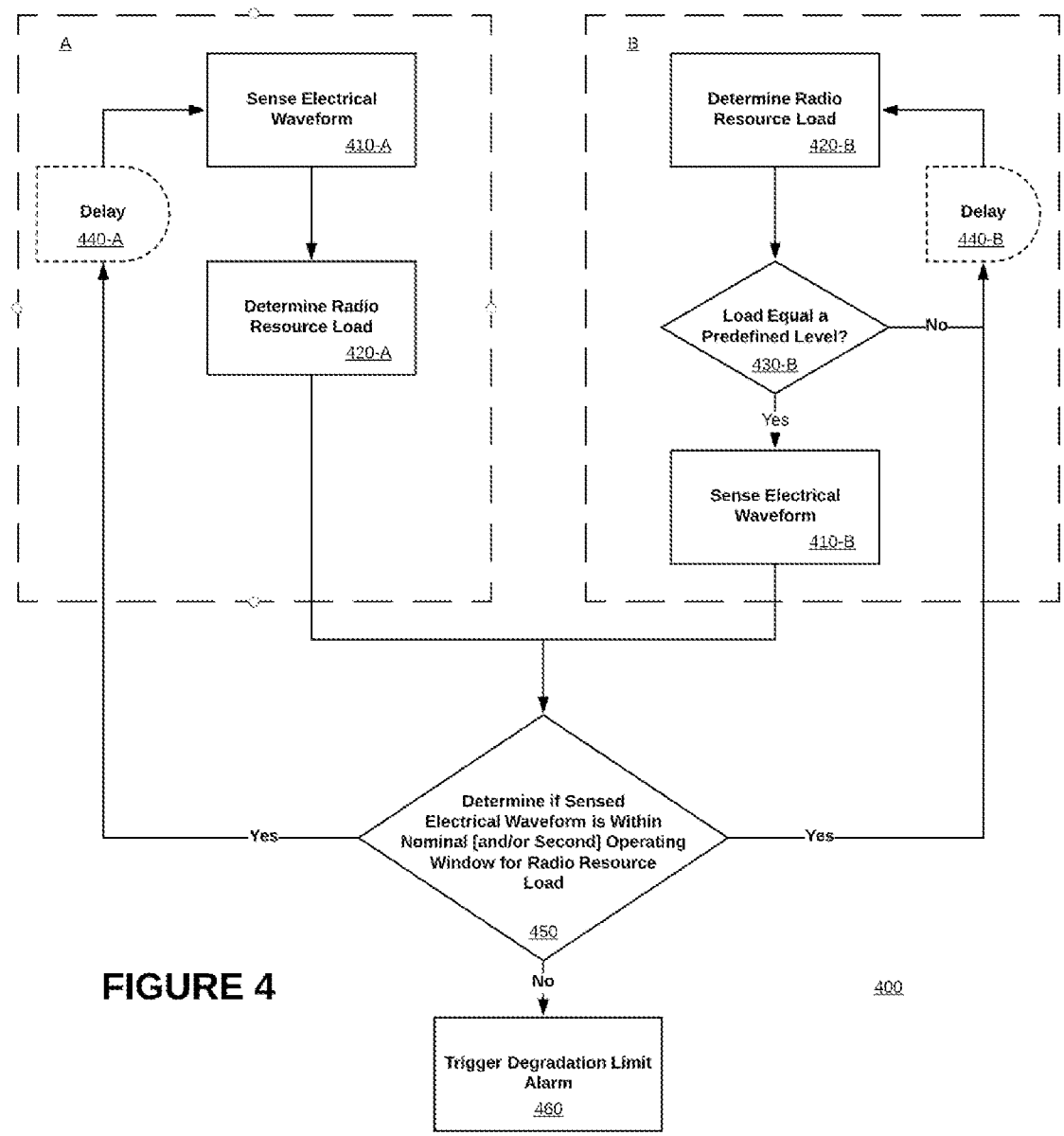
FIG. 4 illustrates a general method for pre-fault detection of a potential failure of radio base station (RBS) hardware; and, FIG. 5 illustrates a detailed method for pre-fault detection of a potential failure of radio base station (RBS) hardware.

Turning now to FIG. 4, illustrated is an exemplary method 400 for pre-fault detection of hardware degradation. In general, method 400 is characterized by sensing at least a portion of an electrical waveform at a circuit location in the RBS; determining the radio resource load of the RBS proximate to the time of sensing the electrical waveform, the radio resource load being a measure of scheduled radio transmissions; determining whether the sensed electrical waveform is within a nominal operating window corresponding to the radio resource load, wherein the nominal operating window is a function of the sensed electrical waveform for the radio resource load at a prior time; and, if the sensed electrical waveform is not within the corresponding nominal operating window, triggering an alarm to indicate that the hardware has reached a degradation limit. The functions of sensing an electrical waveform and determining the corresponding radio resource load can be performed independently and in any desired sequence; FIG. 4 illustrates two options A and B. For option A, an electrical waveform is sensed in step 410-A, followed by the determination of the corresponding radio resource load in step 420-A. For option B, the radio resource load is determined in step 420-B, followed by a determination of whether the load equals a predefined level (e.g., 10%, 20%, etc.); if so, then a desired electrical waveform is sensed in step 410-B. In both embodiments, it is then determined in step 450 whether the sensed electrical waveform is within a nominal, and/or second (further), operating window for the corresponding radio resource load; if not, then a degradation limit alarm is triggered in a step 460. A degradation limit alarm can be sent to a node 130 of core network 120 that performs Operations Support System (OSS) functions; the OSS can track the hardware degradation associated with each RBS to schedule maintenance or replacement of affected hardware to ensure continued network reliability. Through the accumulation of hardware degradation data from all managed RBSs, an OSS can also utilize artificial intelligence (AI) techniques to predict hardware failures or to determine optimal nominal operating windows for each sensed electrical waveform, which can then be pushed to each RBS for future measurements.

As preferred, the step of sensing the electrical waveform can be performed at predefined intervals or whenever the radio resource load corresponds to one or more predefined levels. Thus, for option A, a delay 440-A can be optionally utilized to control a predefined interval, after determining whether a sensed electrical waveform is within an operating window for a given radio resource load (step 450), before again sensing the electrical waveform in step 410-A; alternatively, for option B, a delay 440-B can be employed to limit the frequency of determining the radio resource load, either after determining that the load does not equal a predefined level (step 430-B) or after determining whether a sensed electrical waveform 410-B is within an operating window for a predefined radio resource load (step 450).

Determining whether the sensed electrical waveform is within a nominal operating window (step 450) requires determining whether it is within a range defined by an upper or lower threshold, or both. For some circuit measurements, it may be known that component degradation will always lead to higher values and, thus, only an upper limit for the sensed electrical waveform may be defined; for other circuit measurements, the converse may be true and only a lower limit for the sensed electrical waveform need be defined. In some embodiments, as illustrated and described with reference to FIGS. 3-B and 3-C, a nominal operating window can be defined by, or further defined by, a temporal measure of the electrical waveform; e.g., it can have boundaries that are a function of a predefined deviation from a temporal value, such as a given duty cycle ΔT of SMPS 300 for a particular radio resource load. In all embodiments, such absolute and temporal values, individually or in combination, can be employed to define a nominal operating window for each particular sensed electrical waveform.

In some embodiments, step 450 can also determine whether a sensed electrical waveform is within a second (or further) operating window $W_Z$, as described with reference to FIGS. 3-B and 3-C. By determining whether a sensed electrical waveform has exceeded a nominal operating window and one or more further operating windows can be indicative of a relative measure of degradation of the hardware. By logging the date and time of when an electrical waveform exceeds the limits of successive operating windows, a rate of degradation can be calculated in order to predict when a certain measure of hardware degradation that could lead to a system failure is likely to occur. In such embodiments, the step of triggering an alarm in step 460 can further include indicating the relative measure of degradation of the hardware.

Figure 5:
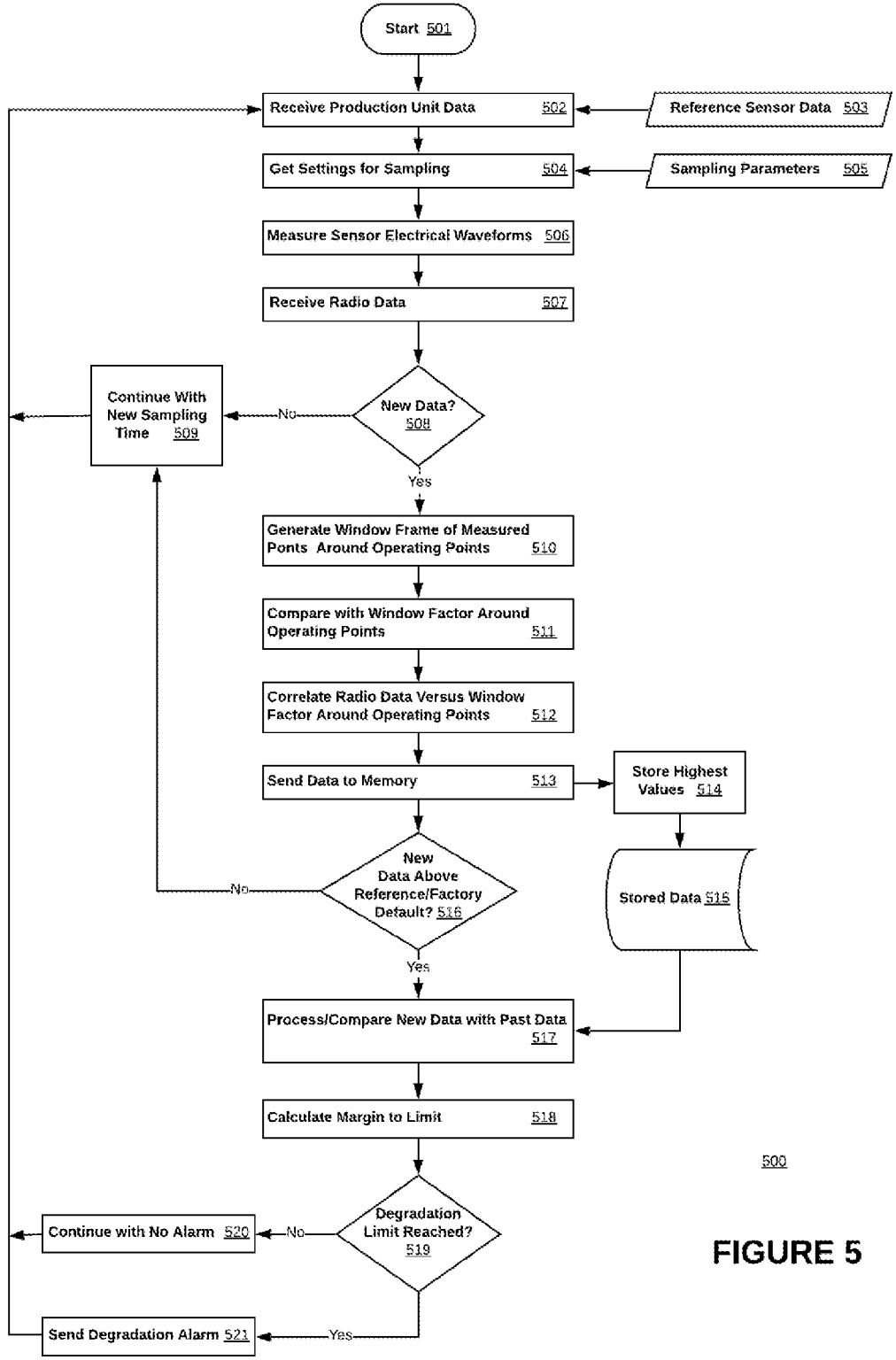

Finally, FIG. 5 illustrates a detailed method 500 for pre-fault detection of RBS hardware degradation, and is characterized by:

501: The process is started.

502/503: Production unit data is received 503, which includes receiving reference sensor data 503. Production unit data, or reference values, can be based on the value of a sensed electrical waveform at the time of manufacture, or a value after a period of operation in the field to allow for "burn-in". The reference sensor data can be, with reference to FIG. 3-A, information related to probes 361, 362, and 363, such as the type of measurement (e.g., voltage, current, temperature) and values defining the sensed waveform (e.g., the value(s) of the waveform over a predefined time period).

504/505: Settings for sampling the electrical waveform(s) are received 504, which includes receiving sampling parameters 505. The sampling parameters can be, for example, a predefined sampling period (e.g., seconds); a trigger for beginning to sample an electrical waveform (e.g., one or more radio resource loads, such as 10%, 20%, etc.); and, a window "factor", which can be defined by an allowable deviation of the sensed electrical waveform from production unit values.

506: Measurements are taken for each sensed electrical waveform; e.g., measurements are taken for each of the probes 361, 362, and 363.

507: Radio data is received that indicates the radio resource load.

507: It is determined whether there is any new data; if not, the sampling process is continued 509, which may be done following a predefined delay. If new data was obtained, a window "frame" is generated 510 from the measurements around the corresponding operating points.

511: The "frame" is compared with the window factor.

512: Radio resource load is correlated to the actual window defined (to be able to foresee degradation), based on the actual values, and window values, difference, defining a degradation.

513: Data is sent to memory, which can be limited to storing the highest values 514 in a stored data location 515; the data may be stored local to where the process is performed or within any suitable data repository of wireless communications network 100.

516: It is determined whether the new data exceeds the reference/factory values; if not, sampling is continued 509. If the new data exceeds the reference/factory values, the data is compared with past data obtained from stored data 515.

517: Based on the comparison of data, a margin to a degradation limit is calculated.

518: It is determined if the degradation limit has been reached; if not, sampling is continued 520. If a degradation limit has been reached, however, an alarm is triggered 521.

The foregoing has described various embodiments suitable for pre-fault detection of hardware degradation in an RBS of a wireless communications network, which is determined as a function of radio resource load. The principles, however, are applicable to other networks, such as general computer networks, which are also susceptible to down-time due to unexpected hardware failure. In such networks, the sensing of electrical waveforms within the computer hardware, such as associated failure-prone power supplies, can be performed as a function of computing load on individual computer servers. In all such systems, the principles can be utilized advantageously to determine a measure of hardware degradation prior to a failure, whereby a system component or subsystem can be replaced without experiencing any system downtime.

We claim:

1. A method in a communications network for pre-fault detection of radio base station (RBS) hardware degradation, said method comprising the steps of:

sensing at least a portion of an electrical waveform at a circuit location in said RBS;

determining a radio resource load of said RBS proximate to the time of said sensing, said radio resource load being a measure of scheduled radio transmissions;

determining whether said sensed electrical waveform is within a nominal operating window corresponding to said radio resource load, said nominal operating window being a function of the sensed electrical waveform for said radio resource load at a prior time; and, if the sensed electrical waveform is not within said corresponding nominal operating window, triggering an alarm to indicate said hardware has reached a degradation limit.

2. The method recited in claim 1, wherein said step of sensing is performed whenever said radio resource load corresponds to one or more predefined levels.

3. The method recited in claim 1, wherein said step of sensing is performed at predefined intervals.

4. The method recited in claim 1, wherein said step of sensing comprises sampling said electrical waveform for a predefined sampling period.

5. The method recited in claim 1, wherein said nominal operating window is defined by at least an upper or lower threshold.

6. The method recited in claim 5, wherein said upper or lower threshold is a function of a predefined deviation of said sensed electrical waveform from said electrical waveform at said prior time.

7. The method recited in claim 1, wherein said prior time for said hardware corresponds to a value at the time of manufacture.

8. The method recited in claim 1, further comprising determining whether said sensed electrical waveform is within a second operating window, said second operating window being greater than said corresponding nominal operating window and indicative of a relative measure of degradation of said hardware.

9. The method recited in claim 8, wherein said step of triggering an alarm further comprises indicating said relative measure of degradation of said hardware.

10. The method recited in claim 1, wherein said hardware comprises a DC/DC converter in said radio base station.

11. The method recited in claim 1, wherein said nominal operating window is a function of a temporal measure of said electrical waveform at said prior time.

12. The method recited in claim 11, wherein said nominal operating window comprises boundaries that are a function of a predefined deviation from said temporal measure.

13. A system in a communications network for pre-fault detection of radio base station (RBS) hardware degradation, said system comprising:
at least one processor; and,
at least one memory, said at least one memory comprising instructions which, when executed by said at least one processor, are operative to:
cause a sensing of at least a portion of an electrical waveform at a circuit location in said RBS;
determine a radio resource load of said RBS proximate to the time of said sensing, said radio resource load being a measure of scheduled radio transmissions;
determine whether said sensed electrical waveform is within a nominal operating window corresponding to said radio resource load, said nominal operating window being a function of the sensed electrical waveform for said radio resource load at a prior time; and,
trigger an alarm if the sensed electrical waveform is not within said corresponding nominal operating window to indicate said hardware has reached a degradation limit.

14. The system recited in claim 13, wherein said sensing is performed whenever said radio resource load corresponds to one or more predefined levels.

15. The system recited in claim 13, wherein said sensing is performed at predefined intervals.

16. The system recited in claim 13, wherein said sensing comprises sampling said electrical waveform for a predefined sampling period.

17. The system recited in claim 13, wherein said nominal operating window is defined by at least an upper or lower threshold.

18. The system recited in claim 17, wherein said upper or lower threshold is a function of a predefined deviation of said sensed electrical waveform from said electrical waveform at said prior time.

19. The system recited in claim 13, wherein said prior time for said hardware corresponds to a value at the time of manufacture.

20. The system recited in claim 13, wherein said instructions, when executed by said processor, are further operative to determine whether said sensed electrical waveform is within a second operating window, said second operating window being greater than said corresponding nominal operating window and indicative of a relative measure of degradation of said hardware.

21. The system recited in claim 20, wherein triggering an alarm further comprises indicating said relative measure of degradation of said hardware.

22. The system recited in claim 13, wherein said hardware comprises a DC/DC converter in said radio base station.

23. The system recited in claim 13, wherein said nominal operating window is a function of a temporal measure of said electrical waveform at said prior time.

24. The system recited in claim 23, wherein said nominal operating window comprises boundaries that are a function of a predefined deviation from said temporal measure.

25. A radio base station (RBS) for use in a communications network, said RBS operative to detect DC/DC converter hardware degradation in an associated radio unit, said RBS comprising:
at least one processor; and,
at least one memory, said at least one memory comprising instructions which, when executed by said at least one processor, are operative to:
cause a sensing of at least a portion of an electrical waveform at a circuit location in said DC/DC converter;
determine a radio resource load of said RBS proximate to the time of said sensing, said radio resource load being a measure of scheduled radio transmissions by said associated radio unit;
determine whether said sensed electrical waveform is within a nominal operating window corresponding to said radio resource load, said nominal operating window being a function of the sensed electrical waveform for said radio resource load at a prior time; and,
trigger an alarm if the sensed electrical waveform is not within said corresponding nominal operating window to indicate said DC/DC converter has reached a hardware degradation limit.

26. The RBS recited in claim 25, wherein said sensing is performed whenever said radio resource load corresponds to one or more predefined levels.

27. The RBS recited in claim 25, wherein said sensing is performed at predefined intervals.

28. The RBS recited in claim 25, wherein said sensing comprises sampling said electrical waveform for a predefined sampling period.

29. The RBS recited in claim 25, wherein said nominal operating window is defined by at least an upper or lower threshold.

30. The RBS recited in claim 29, wherein said upper or lower threshold is a function of a predefined deviation of said sensed electrical waveform from said electrical waveform at said prior time.

31. The RBS recited in claim 25, wherein said prior time for said hardware corresponds to a value at the time of manufacture.

32. The RBS recited in claim 25, wherein said instructions, when executed by said processor, are further operative to determine whether said sensed electrical waveform is within a second operating window, said second operating window being greater than said corresponding nominal operating window and indicative of a relative measure of hardware degradation of said DC/DC converter.

33. The RBS recited in claim 32, wherein triggering an alarm further comprises indicating said relative measure of degradation of said hardware.

34. The RBS recited in claim 25, wherein said nominal operating window is a function of the duty cycle of said DC/DC converter for said radio resource load at said prior time.

35. The RBS recited in claim 34, wherein said nominal operating window comprises boundaries that are a function of a predefined deviation from said duty cycle.

* * * * *